(12) United States Patent
James

(10) Patent No.: US 7,252,419 B1
(45) Date of Patent: Aug. 7, 2007

(54) MOTORCYCLE HEADLIGHT ASSEMBLY

(75) Inventor: Jesse G. James, Surfside, CA (US)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 10/730,274

(22) Filed: Dec. 9, 2003

(51) Int. Cl.
*F21S 8/10* (2006.01)
*F21V 14/04* (2006.01)

(52) U.S. Cl. ............ 362/515; 362/527; 362/523; 362/528; 362/287

(58) Field of Classification Search ........ 362/468, 362/515, 528, 530, 547, 525, 527, 476, 475, 362/419, 420, 421, 425, 427, 428, 523, 287, 362/269
See application file for complete search history.

(56) References Cited

U.S. PATENT DOCUMENTS

| | | | | |
|---|---|---|---|---|
| 3,868,500 A | * | 2/1975 | Martin ............ | 362/464 |
| 4,024,387 A | * | 5/1977 | Alphen ............ | 362/468 |
| 4,102,712 A | * | 7/1978 | Martin ............ | 362/468 |
| 4,237,524 A | * | 12/1980 | Hundemer ......... | 362/475 |
| 4,437,143 A | * | 3/1984 | Hayashi et al. ..... | 362/272 |
| RE32,088 E | * | 2/1986 | Sip ............... | 362/549 |
| 4,622,622 A | * | 11/1986 | Baba .............. | 362/476 |
| 5,077,642 A | * | 12/1991 | Lisak ............. | 362/463 |
| 5,176,443 A | * | 1/1993 | Lin ............... | 362/413 |
| 5,186,532 A | * | 2/1993 | Ryder et al. ....... | 362/528 |
| 5,426,571 A | * | 6/1995 | Jones ............. | 362/466 |
| 5,440,457 A | * | 8/1995 | Meyer ............ | 362/547 |
| 5,906,431 A | * | 5/1999 | Chianale et al. .... | 362/515 |
| 5,908,239 A | * | 6/1999 | Sugimoto ......... | 362/528 |
| 6,592,241 B1 | * | 7/2003 | Kovacik et al. ..... | 362/419 |
| 6,793,359 B2 | * | 9/2004 | Iwamoto .......... | 362/39 |
| 6,796,693 B2 | * | 9/2004 | Clinch et al. ...... | 362/512 |
| 6,808,298 B2 | * | 10/2004 | Christensen ....... | 362/473 |
| 2004/0145906 A1 | * | 7/2004 | Clinch et al. ...... | 362/512 |

* cited by examiner

*Primary Examiner*—Sandra O'Shea
*Assistant Examiner*—Anabel Ton
(74) *Attorney, Agent, or Firm*—Plumsea Law Group, LLC

(57) ABSTRACT

An adjustable motorcycle headlight with multiple degrees of freedom enables the rider to aim the light where it is needed, as well as facilitating the factory assembly process by enabling fine adjustment after the headlight is mounted. The motorcycle headlight is attached to the frame via a ball and socket structure cooperatively coupled to at least one positioning arm provided in tandem with the ball and socket structure for accommodating and stabilizing the movement of the ball and socket joint and locking same in position. The positioning arm includes a series of straight segments rotatably attached to one another via adjusters which can be loosened to enable adjustment, and tightened to affix the positioning arm into place. The combination of the ball and socket joint with a pair of positioning arms also provides a stable, robust three-point attachment mount for the headlight.

11 Claims, 4 Drawing Sheets

MOTORCYCLE HEADLIGHT ASSEMBLY

BACKGROUND OF THE INVENTION

1. Field of the Invention

A motorcycle headlight assembly having a ball and socket joint and adjustable positioning arms between the headlight and the mounting frame enables fine adjustment of the headlight with multiple degrees of freedom, and a stable, robust mounting assembly after adjustment.

2. Background of the Invention

Conventionally motorcycle headlights are generally rigidly affixed to a mounting frame and cast light in a predetermined, fixed field. Conventional headlight assemblies typically consist of an upper mounting bracket and a lower mounting bracket. The upper mounting bracket may be a ball and socket type of joint. The lower mounting bracket sometimes incorporates a spring and allows for some vertical adjustment of the headlight. The conventional brackets and the headlight need to be assembled with relatively tight tolerances in order to maintain the predetermined aim of the headlight in accordance with traffic and safety standards, and to ensure that the headlight assembly does not interfere with other components in proximity.

Whether in motion or stationary a rider may have a need to illuminate an area outside of the predetermined headlight field. Conventional headlights do not enable fine adjustment in the direction of the light so an auxiliary light source may be required or a rider may have to proceed without proper illumination.

SUMMARY

An adjustable motorcycle headlight with multiple degrees of freedom enables the rider to aim the light where it is needed most for the particular condition, as well as facilitating the assembly process by enabling adjustment after the headlight is mounted. The mounting structure comprises more than a single point attachment or upper and lower attachments to provide more stability and robustness than conventional assemblies. The motorcycle headlight is attached to the frame via a ball and socket structure cooperatively coupled to at least one positioning adjuster. The headlight housing has an integrated boss on its rear side in which is provided the socket for a ball and socket structure. The counterpart ball portion of the joint is affixed to the frame. In addition to the ball and socket structure, at least one positioning arm is provided in tandem therewith for accommodating and stabilizing the movement of the ball and socket joint and locking same in position. Preferably two positioning arms are employed, on either side of the ball and socket structure and attached to the boss so as to form a three point attachment of the headlight to the frame.

Each positioning arm has one end rotatably attached to a retaining boss on the headlight housing, and the opposite end rotatably attached to the frame in a similar fashion. Between the two ends, each positioning arm comprises a series of straight segments joined by adjusters and movable joints. Moving from the headlight housing toward the frame, a single straight segment is mounted into the retaining boss of the headlight housing, and this single straight segment is joined to a double straight segment by an adjuster. The double straight segment comprises two straight segments joined together by a specially configured male-female coupling that allows rotating and pivoting movement between these segments. The double straight segment is joined to another single straight segment by another adjuster. This upper single straight segment is attached to the frame. The adjusters are threaded members which can be loosened to enable adjustment of the segments and then tightened to rigidly affix the elements of the positioning arm in place. The straight segments rotate relative to one another to provide for adjustment. The length of the positioning arm can be adjusted by adjusting the angle between the straight segments of the positioning arm. That is, the smaller the angle between straight segments, the shorter the overall length of the positioning arm.

Two positioning arms of identical construction provided each on either side of the ball and socket structure enable adjustment of the headlight with multiple degrees of freedom. This also provides a three point attachment that is more stable than conventional mounting assemblies.

The adjustable mounting assembly provides greater tolerances for initial assembly of the headlight onto the frame since adjustments to fit the headlight assembly into place with respect to neighboring components is eased.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views. In the drawings.

DETAILED DESCRIPTION

Figure 1:
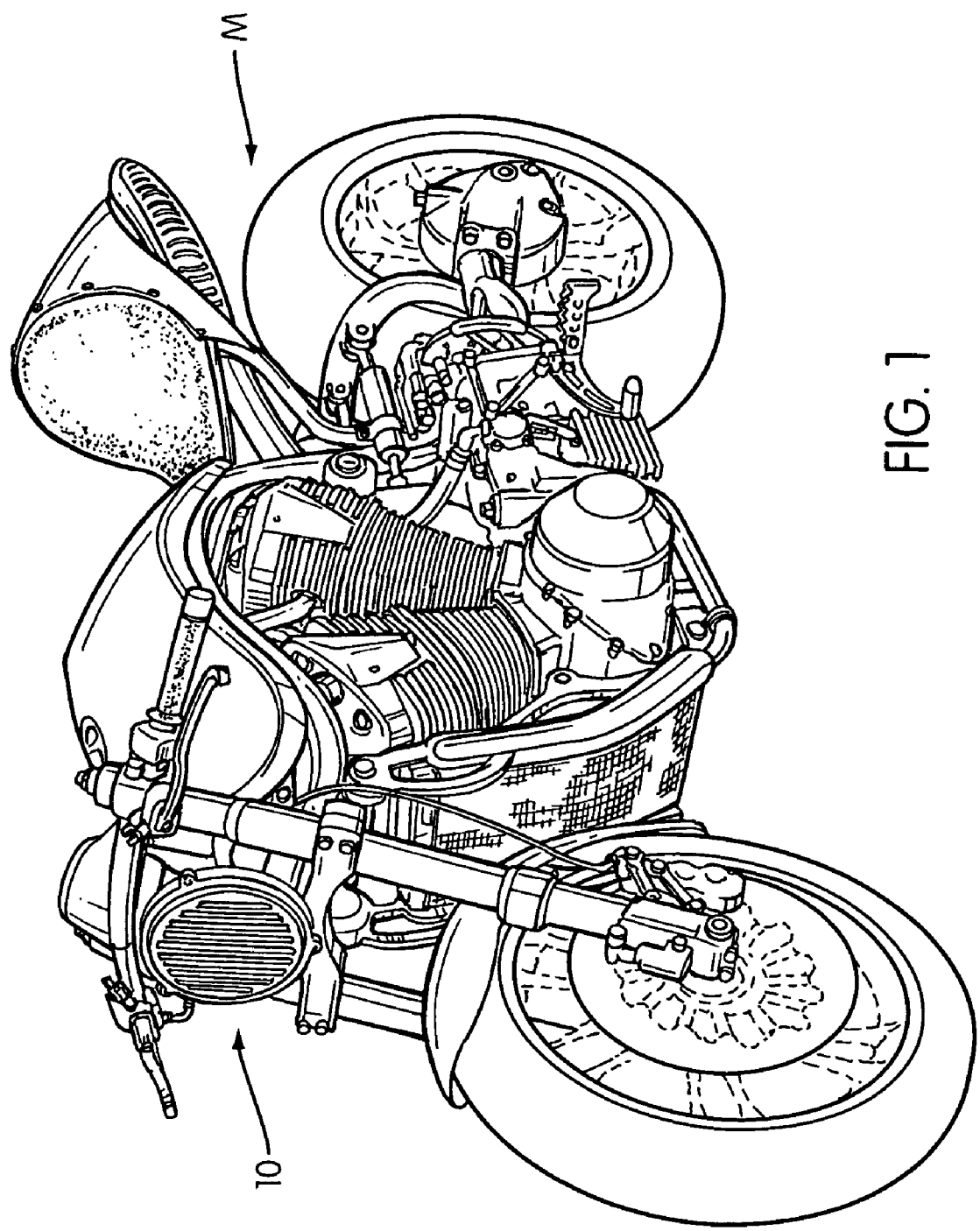
FIG. 1 is a perspective view of a motorcycle.
Figure 3:
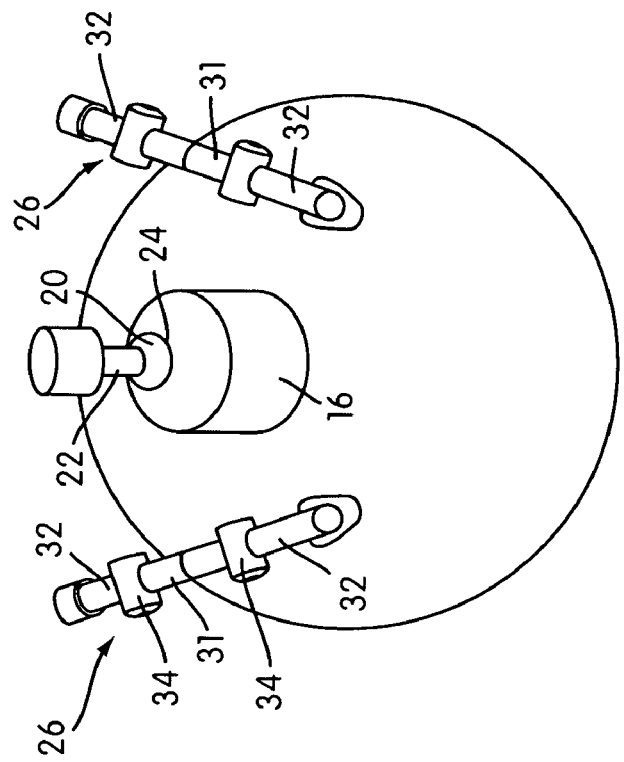
FIG. 3 is a rear elevational view of the assembly.
Figure 2:
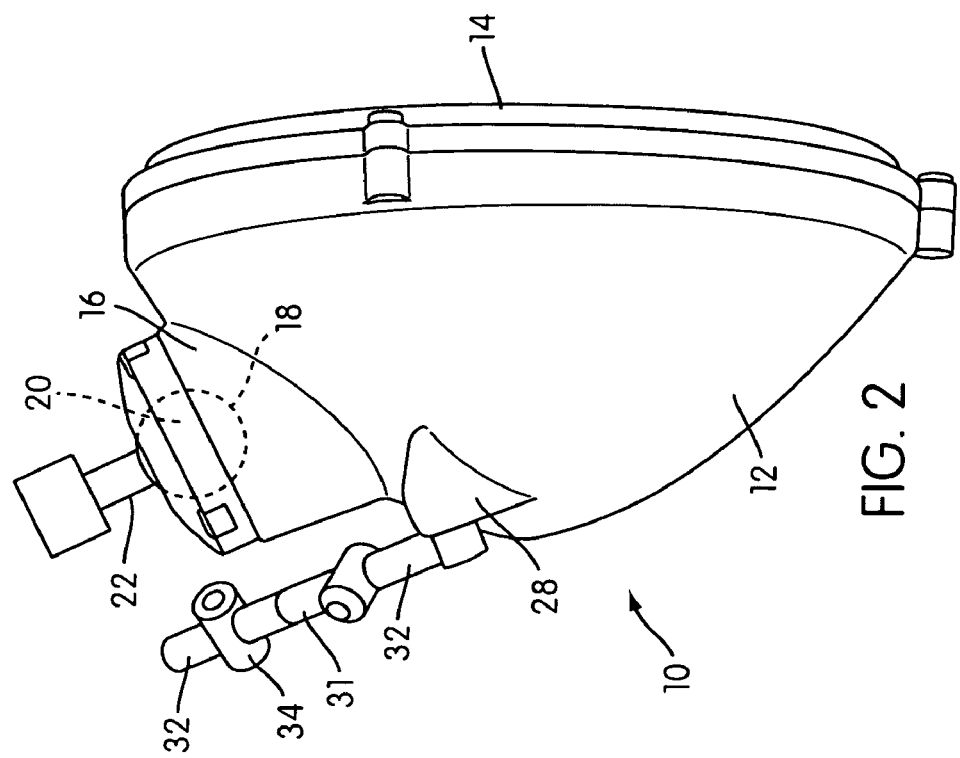
FIG. 2 is a perspective view of the motorcycle headlight assembly.
Figure 4:
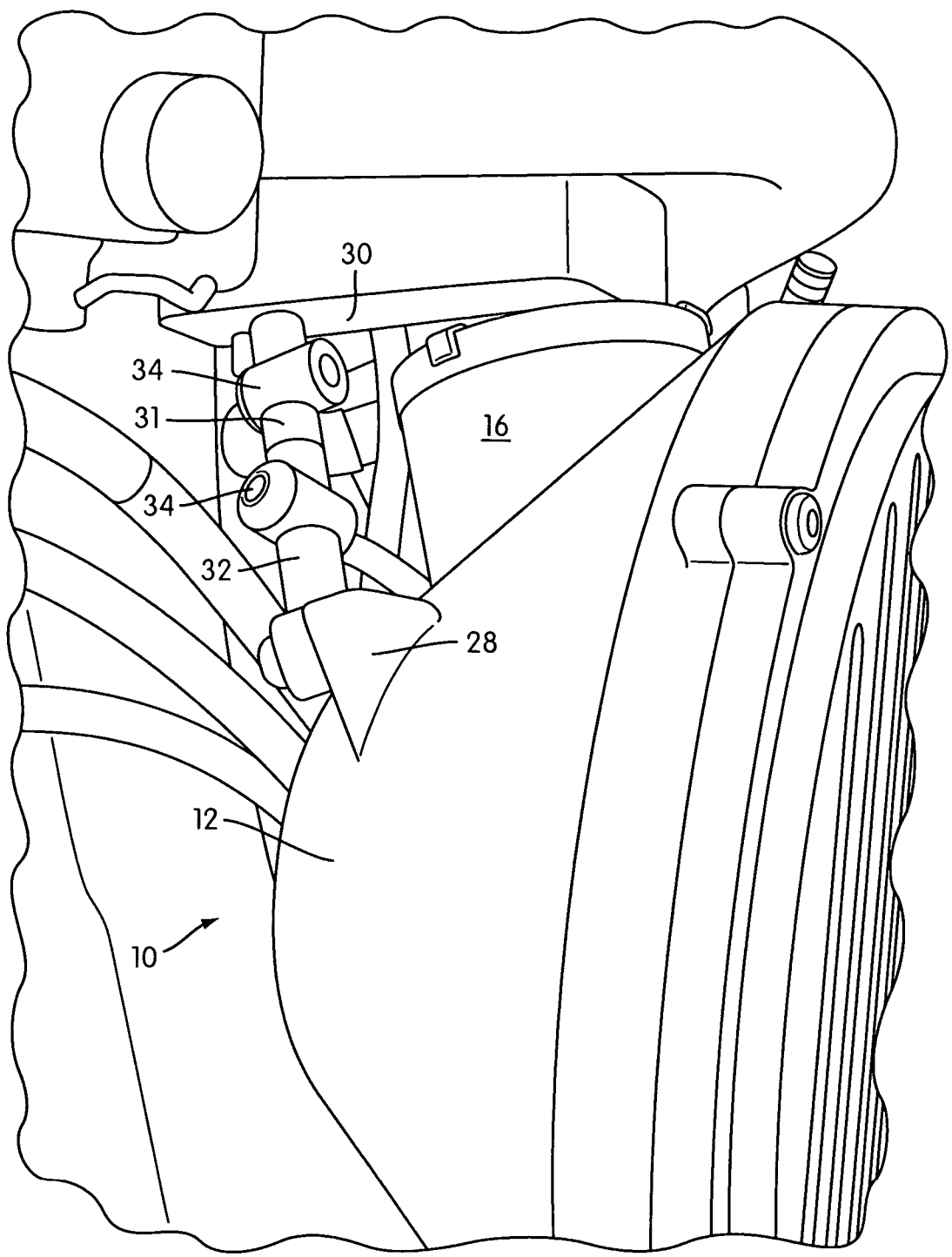
FIG. 4 is a perspective view of the motorcycle headlight assembly mounted to the frame.

On a motorcycle M, FIG. 1, motorcycle headlight assembly 10 comprises a headlight housing 12 and a lens 14 on the forward side. Headlight housing 12, FIGS. 2–4, includes an integral boss 16 in which is formed a socket 18 which receives mating ball 20 to form a ball and socket joint structure. Ball 20 is provided at the end of a ball shaft 22, the other end of which is rigidly affixed to the frame in a known manner. Boss 16 is preferably disposed on the top, rear portion of housing 12 such that ball shaft 22 can be attached to the frame in a downwardly extending orientation. Opening 24 in boss 16 defines the periphery of the contact surface of ball shaft 22, and therefore the range of motion of the ball and socket relative to one another. The ball and socket structure are similar to conventional structures for headlight mounting assembles. The ball and socket arrangement enables rotational motion and translational motion in all directions. With respect to the ball and socket joint, the term "translational motion" encompasses the resulting motion of moving the ball and socket relative to one another.

In cooperation with the ball and socket structure, positioning arms 26 are provided on either side of housing 12. Each positioning arm 26 has one end rotatably mounted to housing 12 by a retaining boss 28, and the opposite end rotatably mounted to the frame by another retaining boss 30. Between these retaining bosses, each positioning arm includes at its center a double straight segment 31 and single straight segments 32 at each end of segment 31. Adjusters 34 join together segments 31 and 32, and are preferably disposed in 90° offset relation to one another to enable adjustment in perpendicular axes. Central, double straight segment 31 is actually a male-female coupled joint that is described in more detail with respect to FIGS. 5–7. The joint in double segment 31 enables both rotational and pivotal adjustment that enables each positioning arm 26 to cooperate in adjusting the position of the headlight via the ball and socket structure, and to lock the headlight into place. That is, segment 31 acts as an elbow joint so the positioning arms can be lengthened or shortened, and adjusted from side to side to compensate for any particular conditions or customized materials.

Figure 6:
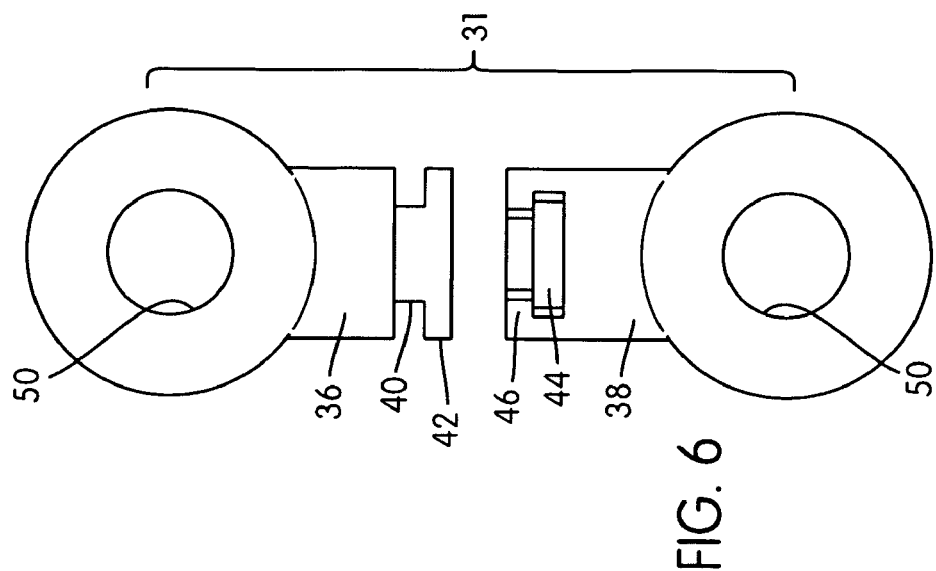
FIG. 6 is a top plan view of the assembly of FIG. 5.
Figure 5:
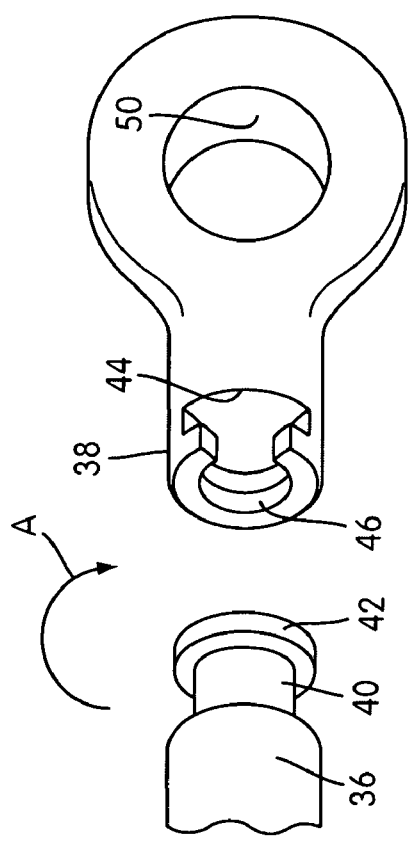
FIG. 5 is a partial perspective exploded view of the double straight segment in the center of a positioning arm.
Figure 7:
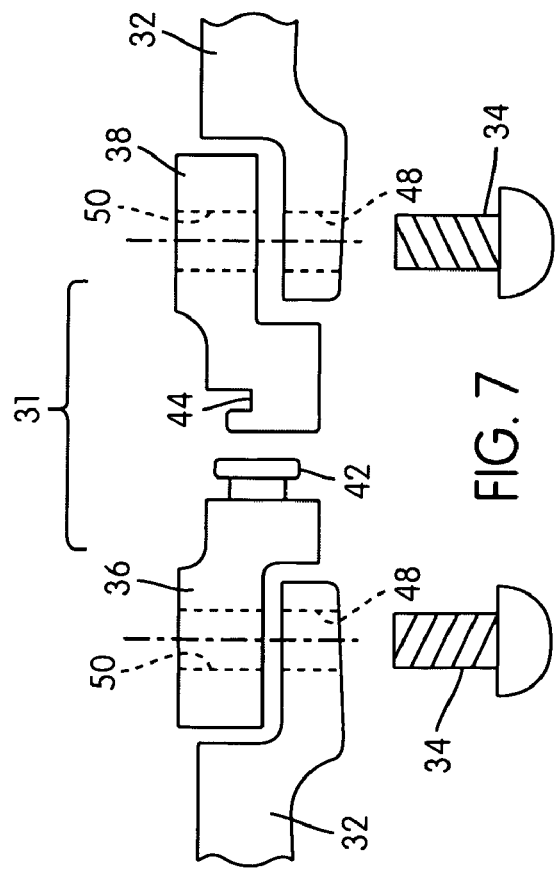
FIG. 7 is an elevational view of the positioning arm assembly.

Positioning arms 26 are adjustable in overall length by adjustment of adjusters 34. Single segments 32 each have an internally threaded connection eye 48. A detailed look at double straight segment 31 in FIGS. 5–7 shows that the central straight segment is actually a coupling of a male element 36 and a female element 38. Male element 36 has a reduced diameter portion 40 and an end boss 42. Female element 38 is formed with a slot 44 which is sized to matingly receive end boss 42 of the male element. Female element 38 is also formed with an annular collar 46 at its end so as to abut against and engage end boss 42 when the male element and female element are coupled together. This slotted joint arrangement enables elements 36 and 38 to rotate, for example in the direction of arrow A, and pivot relative to one another to provide an elbow joint. Male and female elements 36, 38 have at their free ends internally threaded connection eyes 50 each of which aligns with connection eye 48 of segment 32 for reception of an adjuster 34. The desired orientation of elements 36 and 38 can be achieved by rotational adjustment of the segments to position slot 44 in a desired manner for pivoting.

When the male element and female element are coupled together to form the double straight segment, successive straight segments are fastened together through aligned connection eyes as seen in FIG. 7. A suitable fastener 34 is employed to attach the straight segments together. One type of suitable fastener is a threaded fastener with an allen head. The user can adjust the angle between the straight segments by employing an alien head driver. As will be apparent to one of skill in the art, adjusting the angle between adjacent straight segments will adjust the overall length of the positioning arm.

In use, all of the adjusters would be loosened to enable movement of the positioning arms. As can be seen from FIGS. 5–7, the adjusters will allow the straight segments to rotate relative to one another about the connection eyes. In addition, double straight segment 32 can also pivot about its male-female joint to enable lengthening or shortening of the positioning arm. Once the headlight is adjusted and positioned as necessary, the adjusters are then tightened to rigidly affix the relative positions of the straight segments 31, 32 into place.

The combination of the ball and socket structure and the positioning arms allows the headlight to be adjusted with a multitude of degrees of freedom. Each positioning arm provides three joints along its length to enable fine adjustment. Further, since each positioning arm is adjusted independently of the other, any asymmetry can be easily compensated. The combination also provides a strong three-point attachment of the headlight to the frame. The positioning arms extend and rotate at the adjusters as necessary to accommodate and stabilize the movement of the ball and socket joint. This provides the user with the ability to train the headlight as needed to illuminate different areas as desired.

Besides the advantages to the rider, the adjustable motorcycle headlight also provides time saving and cost effective advantages to the manufacturer or assembler. Because the front frame area of a motorcycle is normally crowded with a number of necessary components that are mounted on the frame or in close proximity, assembly of a conventionally mounted headlight and nearby components is done with relatively close tolerances to accommodate all of the different pieces that must be fit into a compact area. With an adjustable headlight assembly as disclosed, there are greater tolerances for the headlight assembly itself and neighboring components during manufacture and assembly. Since the headlight can be movably adjusted, the distances between the headlight and nearby components need not be as precisely repeatable as with convention assemblies.

Depending on the components to be assembled to the front frame, and any allowance given to leaving customizable options for a user, the ball and socket placement may be reversed. In other words, an integral boss with the socket could be rigidly attached to the frame while the mating ball is affixed to the headlight housing in some manner. If the headlight assembly needed to provide more space in the upper area then such a reversed placement of the ball and socket elements may be advantageous.

While various embodiments of the invention have been described, it will be apparent to those of ordinary skill in the art that may more embodiments and implementations are possible that are within the scope of the invention.

What is claimed is:

1. An adjustable motorcycle headlight assembly comprising:
   a headlight housing having a lens on a forward side thereof, and an integral boss incorporating a socket;
   a mating ball provided at one end of a ball shaft, the other end of said ball shaft adapted to be rigidly affixed to a motorcycle frame, wherein said ball and said socket are matingly engaged to provide a ball and socket joint structure enabling rotational and translational movement of said ball and said socket relative to one another; and
   a positioning arm having one end attached to said headlight housing via a retaining boss integrally provided on said housing, and an opposite end adapted to be rotatably attached to the motorcycle frame, said positioning arm being adjustable lengthwise and movable both rotationally and translationally relative to said retaining boss.

2. The adjustable motorcycle headlight of claim 1, wherein said positioning arm further comprises:
   at least two straight segments joined together by an adjuster therebetween.

3. The adjustable motorcycle headlight of claim 1, wherein said positioning arm further comprises a male-female coupling enabling rotational and pivotal movement relative to one another to provide length and position adjustment thereof.

4. The adjustable motorcycle headlight of claim 1, wherein said positioning arm further comprises a central double segment including a male-female coupling joined to a straight segment at both ends via aligned connection eyes attached by adjusters.

5. A motorcycle headlight comprising:
   a headlight housing; and
   a three point mounting assembly integrated to a rear side of said headlight housing, including a ball provided at a free end of said mounting shaft, said ball matingly received in a mating socket formed in a portion of said headlight, wherein said adjustment mechanism enables movable adjustment of said headlight relative to said mounting shaft; and a pair of extendable and rotatable positioning arms each attached to said headlight at one end and adapted to be rotatably attached to the frame at another end.

6. An adjustable motorcycle headlight assembly comprising:
   a headlight housing;
   a ball and socket structure movably connected to said headlight housing and adapted to be rigidly attached to a frame for providing adjustability of said headlight housing; and
   a pair of positioning arms connected to said headlight housing and adapted to be attached to the frame, each said positioning arm including an adjustment mechanism enabling length and rotational adjustment thereof.

7. The adjustable motorcycle headlight assembly of claim 6, wherein each said adjustment mechanism comprises a first segment attached to said headlight housing at one end and attached at the other end to a second segment via a threaded adjuster, said second segment attached to a third segment via another threaded adjuster, said third segment adapted to be attached to the frame.

8. The adjustable motorcycle headlight assembly of claim 7, wherein said adjusters are received in aligned, internally threaded connection eyes of said first, second and third segments, and wherein loosening said adjusters enables relative movement of said segments, and tightening of said adjusters affixes said segments into place.

9. The adjustable motorcycle headlight assembly of claim 7, wherein each said second segment comprises a male-female coupling having a slotted joint arrangement to enable rotatable and pivotable movement relative to one another.

10. The adjustable motorcycle headlight assembly of claim 8, wherein each said second segment comprises a male-female coupling having a slotted joint arrangement to enable rotatable and pivotable movement relative to one another.

11. An adjustable central motorcycle headlight assembly comprising:
    a central headlight housing including a lens;
    a mounting assembly for mounting said central headlight housing to a motorcycle frame; and
    adjustment means for adjusting said central headlight housing with respect to a motorcycle frame after assembly thereto, and including means for lengthening and shortening said mounting assembly.

* * * * *